United States Patent [19]

Puyané et al.

[11] Patent Number: 4,495,297
[45] Date of Patent: Jan. 22, 1985

[54] METHOD FOR MAKING A GRADIENT DOPED POLYSILOXANE GEL

[75] Inventors: Ramón Puyané, Petit-Lancy; Carlos J. R. Gonzalez-Oliver, Geneva; Alan L. Harmer, Plan les Ouates, all of Switzerland

[73] Assignee: Battelle Memorial Institute, Carouge, Switzerland

[21] Appl. No.: 507,829

[22] Filed: Jun. 24, 1983

[30] Foreign Application Priority Data

Jul. 26, 1982 [EP] European Pat. Off. ........ 82810317.6

[51] Int. Cl.³ .............................................. C03C 3/04
[52] U.S. Cl. .......................................... 501/12; 65/17; 65/18.1; 501/38; 501/39
[58] Field of Search ................ 501/12, 38, 39; 65/17, 65/18.1

[56] References Cited

U.S. PATENT DOCUMENTS

| 4,220,461 | 9/1980 | Samanta | 501/12 |
| 4,323,381 | 4/1982 | Matsuyama et al. | 501/12 |
| 4,436,542 | 3/1984 | Kurosaki | 65/18.1 |

OTHER PUBLICATIONS

Sumio Sakka et al., "Preparation of Compact Solids from Metal Alkoxides", *Proc. of Int. Symp.* etc., pp. 101–109, 1978, Japan.

Primary Examiner—Helen M. McCarthy
Attorney, Agent, or Firm—Karl F. Ross; Herbert Dubno

[57] ABSTRACT

A partly hydrolyzed gelled polysiloxane mass is contacted with a solution of dopant metal compounds which diffuse therein under thermally controlled condition; alternatively, a partly hydrolyzed gelled polysiloxane mass containing distributed therein dopant metal compounds is contacted with a solvent into which said dopant metal compounds will partly diffuse under thermally controlled conditions.

7 Claims, 7 Drawing Figures

METHOD FOR MAKING A GRADIENT DOPED POLYSILOXANE GEL

FIELD OF THE INVENTION

The present invention relates to the preparation of polysiloxane gels with the structure of a "ramified, three dimensional network of structural units covalently linked one to another" as defined in the following reference: P. J. FLORY, Faraday Discuss of the Chem. Soc. 57 (1974), 7-17. More particularly, the invention relates to polysiloxane some of the silanol chain ends of which are alkylated with lower alkyl groups or metallated with doping metals such as Ti, Ge, B, P, Al, Sc, Mg, Ca.

BACKGROUND OF THE INVENTION

Such gels are useful for being converted to glass articles by conventional techniques, e.g. mother preforms for the making of optical fibers. Within the present gel matrix, defined hereinafter as a "wet gel", is intimately entrapped a liquid phase containing lower alkanols, water-soluble organic solvents, acid or basic catalysts providing pH's in the approximate range of 4 to 8 and, possibly, dissolved uncondensed silicon and-/or other metals compounds such as lower alkoxides.

A randomly taken element of the present gel can be illustrated by the following general formula

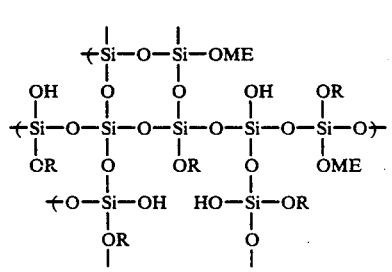
(I)

in which the symbol ME refers to one or more of the above mentioned doping metals, the role of residual valencies on such metals, if any, being explained later, and R means alkyl groups. In the above formula, the tridimensional branching of the illustrated polysiloxane network results from the polycondensation of neighbouring silanol functions and this is shown in the above representation as a purely arbitrary pattern. However, the average length of the straight chains and the number of cross-links per unit of volume of the gel obviously correlates with the physical properties of the gel like, viscosity, stiffness, module of elasticity, modules of rupture and the like. In the present invention, the gels which are obtained are generally weak solids with low modules of rupture, e.g., in the range of $10^{-2}$ MN m$^{-2}$.

In the present gel, the distribution of the substituents (R=lower alkyl groups, ME=metals) and OH depends on the following considerations. Since the gel skeleton originates from the progressive hydrolysis of lower alkoxy silanes and polycondensation of the silanol functions provided by said hydrolysis, the relative number of free OH substituents will depend on the respective rates of hydrolysis of the alkoxides groups and that of the dehydration-condensation of said OH groups. Now, the hydrolysis and polycondensation is homogeneous throughout the medium and, when a certain proportion of the hydrolytically provided silanols have undergone polycondensation (including cross-linking), the mass becomes stiff enough to qualify as a gel. Of course, other determinant factors regarding the properties of the gels are the nature and the proportion of the dopant metals incorporated in the main or side chains of the present network structure.

Indeed, the distribution (i.e. the average number per silicon atom) of the metal-oxide substituents varies in one or two directions of space according to a predetermined pattern. By this, it is meant that if a defined mass or volume of the gel is considered, the average concentration of the dopant metals in each elemental volume of the gel will vary either, say, in the direction of the width or in the direction of both width and length, but not in the direction of the height. Or, in other words, if the gel is cylindrically shaped the metal concentration can follow a radial gradient pattern, being for instance high in the center and low toward the periphery. Generally speaking, the concentration of the metal dopant in the present gel varies from about 0.01 metal atom to about 0.3 metal atom per silicon atom (1 to 30 at. %). Evidently, if the dopant metal is a divalent or plurivalent metal, it can also participate to the polycondensate backbone of the gel and, therefore, it will then appear as in the following illustrative partial formula where the dopant metal (ME) is a tetravalent metal like germanium.

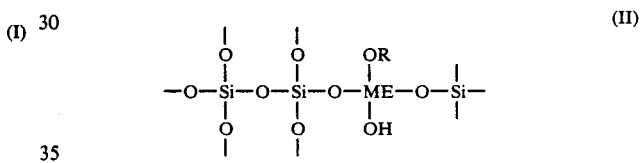
(II)

Of course, if the dopant metal contains further residual valencies (as in formula II above) such will be connected to OR and/or OH groups as for the silicon atoms pictured in formula I.

It has been said that during preparation of the gel, the metal-polysiloxane alkoxide (or compounded polysilicic-polydopant metal acid) cross-linked matrix holds a liquid phase containing alkanols, water, possibly catalysts and uncondensed silicon and other metal alkoxides. This is why the gel is defined as a "wet gel" and is due to the inherent structure of the gel which, as said before, results from the hydrolysis condensation of alkoxysilanes in the presence of variable quantities of other metal alkoxides. Thus, it is easily understandable that the present gel is actually an evolving structure the composition of which may indeed vary depending on the time at which it is considered and the degree of hydrolysis and polycondensation (all other factors being considered constant which is not necessarily so as will be seen later). Hence, the water present is evidently there for hydrolyzing the alkoxide groups and its quantity can vary between wide limits, e.g. between 1 and 30 mole per total moles of silicon and metal alkoxides. Lower alkanols, some part of which being derived from the hydrolysis of the silicon and/or metal alkoxides are also present. Another part of the alkanols is possibly there as a solvent. The alkanols are generally the lower members of the series such as MeOH, EtOH, PropOH and the like. The liquid of the present gel can also contain hydrocompatible solvents such as acetone, ethanolamine and ethyl acetylacetate in quantities ranging from 0.01% to 10% by weight of the gel. The liquid can also contain catalysts, for instance HCl, NH₄OH. Preferably, the amount of catalyst is not over $10^{-2}$ mole per mole of starting silicon alkoxide.

It should be noted that in some cases, the dopant metals can stay trapped in the gel matrix in a form different from the covalently bonded state previously described. For instance, the metal dopants can be there in the oxide or hydroxide state, being attached to the polycondensed backbone by adsorption (hydrogen bonds, Van der Vaals forces, electron transfer forces or the like). When the gel is eventually converted into glass preforms for the drawing of optical fibers, the distribution of dopant metals in said glass will stay the same as in the original gel.

The conversion of the present gel to a glass can be done according to the usual techniques prevalent in the field of converting alkoxide wet gels to dried liquid free structures followed by densifying and sintering at relatively moderate temperatures (moderate being used relatively to glass melting temperatures). Details concerning such techniques can be found in the following references: YAMANE et al, J. Mat Sc. 13 (1978), 865–7a; S. SAKKA & K. KAMIYA, Proc. Int. Symp. "Sintering of oxide and non-oxide Ceramics Japan (1978), 101–9.

Basically, the original mixture is left to equilibrate at room or higher temperature until the hydrolysis and polycondensation of the silicon and other metal compounds results in the formation of a stiff gel. Ageing of the gel by slowly evaporating the liquid surrounding the gel matrix will prevent crack formation in the matrix. After most of the liquid has been removed, the gel which is arbitrarily defined as a "dry gel" because the point where the solid does not contain any more trapped liquid is very difficult to define, is progressively heated to avoid possible ruptures due to internal pressures of volatiles produced by further condensation reaction and eventual oxidation of carbon containing side-products. Upon further heating, the material can be densified and sintered to a glass. This glass is of very high purity depending on the purity of the starting materials used for making the gel and can be finally used for making optical articles with controlled graded refraction indices, e.g. optical fibers. The geometrical distribution of refractive index follows the same pattern as the dopant metal profile which is the fundamental character of the wet gel made by the invention.

SUMMARY OF THE INVENTION

The method of the present invention for preparing the gel of formula (I) comprises the steps of (1) making an alkanol-water solution of silicon alkoxide containing or not containing one or more dopant metals as alkoxides and progressively hydrolyzing part of said alkoxides into the corresponding hydroxy functions with consecutive polycondensation by dehydration of said OH functions to a cross-linked polysiloxane back-boned wet gel, (2) contacting said wet gel with a waterless organic solution of silicon alkoxide containing or not containing one or more dopant metals alkoxides and letting the metals including silicon in free unpolymerized form migrate by diffusion either from the gel into the organic solution or vice-versa, the direction of migration being from the richer to the leaner of the two phases. More specifically, the present method comprises either (A) the steps of (1') making a water-alkanol solution of a silicon alkoxide and letting the alkoxide groups progressively hydrolyze to corresponding silanol functions with consecutive polycondensation and cross-linking of said function to a polysiloxane wet gel, (2') contacting said wet gel with an alkanoic waterless silicon alkoxide solution of a compound of at least one dopant metal and diffusing said metal into the gel until a gradient concentration profile of said dopant in the gel is obtained, or (B) the steps of (1'') making a water-alkanol solution of a silicon alcoxyde containing one or more dopant metals and progressively hydrolyzing the alkoxide groups to corresponding hydroxy functions followed by polycondensation and cross-linking to a uniformly doped polysiloxane wet gel, (2'') contacting said wet gel with an anhydrous alkanolic silicon alkoxide solution for causing the dopant metal in the gel to migrate by diffusion into the anhydrous solution thus forming a partially depleted doped gel with a graded concentration profile.

In order to practically perform the above method, several forms of execution or modifications can be used. According to a first modification of the present invention, a hollow cylindrical container is filled with a tetraalkoxysilane (silicone tetraalkoxide) solution in a water-compatible solvent and water and a catalyst are added to effect the hydrolysis of the alkoxide groups and promote self condensation into polysiloxane. As tetraalkoxysilane, the lower alkoxy compounds such as methoxy, ethoxy, n-propoxy, iso-propoxy, n-butoxy, isobutoxy and the like can be used. As the water compatible solvent, alkanols such as methanol, ethanol, propanol, isopropanol and other solvents such as acetone, tetrahydrofurane, dioxane, monoglyme and the like can be used. As catalysts mineral and organic acids and bases such as HCl, NH₄OH, acetic acid, lactic acid and the like can be used. The mixture is allowed to stand protected from the air at room temperature or higher until it forms a gelled mass sufficiently stiff to be removed without losing its shape from container. In this condition, it has the aspect of a hollow, transparent gelled mass. This mass is immersed, one of the hollow ends down, in a normal container of a diameter substantially identical with the diameter of the gel cylinder and the interior of the latter is filled with a solution of one or more dopant metal compounds. As such, metals selected from Ti, Ge, Al, Mg, Ca, Na, Li, B, P, and the like can be used under the form of organic compounds, preferably alkoxides. The solvent can be a lower alkanol or any other dry organic solvent in which the metal compounds are well soluble, in which they will not readily hydrolyze and which is compatible with the liquid impregnated in the hollow gel matrix. The metal compounds will then progressively diffuse into the hollow gel cylinder, the internal material of which will be doped with a higher concentration of metals than the external portions. As diffusion proceeds, part of diffused metal compounds will also hydrolyze as they travel through the aqueous liquid in which the solid polysiloxane backbone of the cylinder is embedded, thus attaching to said backbone either by adsorption, by co-condensation or by network chain extension or cross-linking. The rate of said "doping" of the polysiloxane skeleton will depend on the local concentration of the diffused dopant and, hence, from the diffusion rate of the dopant specie(s) and its rate of hydrolysis and co-condensation or adsorption. Thus, by properly selecting the types of dopant compounds and using, if desired, mixtures of dopant metals and/or compounds, various diffusion and doping profiles can be obtained; such profiles can be determined by people skilled in the art by routine work in which no particular ingenuity will intervene and a range of many different doped gels according to the invention can be obtained by this method.

If desired, the rate of diffusion can be thermally accelerated and/or controlled by heating the central solution (for instance with a heating rod or with an IR laser) and cooling the external walls of the vessel for instance with a cooling fluid (ice water, $CO_2$ in acetone solution, liquid nitrogen or the like). Once the desired degree of diffusion and doping is attained, the diffusing liquid is removed and the doped wet gel is processed by usual means into a dry gel, a cured gel and finally a densified sintered glass.

According to another modification of the method of the invention, a plain cylindrical container is filled with a mixture of silicon alkoxide and dopant metal alkoxides of various proportions depending on the needs together with the same type solvents, reagents and water used to obtain the hollow gel in the first aforementioned manufacturing embodiment. Once the gel has formed (an early phase in which only a relatively small amount of the ingredients has poly-condensed) to a self-sustained gel, the latter is immersed in a solution of essentially pure silicon tetraalkoxide in a suitable solvent wherefrom the silicon compound can diffuse into the gel and into which part of the still unreacted dopant compounds trapped in the gel can progressively migrate. Thus, here again, after some time of diffusion some dopant concentration gradient profile will be obtained directed radially from the center of the plain cylindrical gel toward the periphery thereof, the higher dopant metal concentration being gathered at the center. As is well known, such a pattern corresponds to a desired one for a mother-rod glass preform which can eventually be derived from the present doped wet gel after drying, curing and sintering as described hereintofore, such preform being used for the melt drawing of optical fibers having a refraction index that decreases radially from the center thereof.

In this case, the diffusion, migration, hydrolysis and co-condensation rates can be thermally controlled, if desired, for instance by externally heating the container with a heating means.

In a variation of the aforementioned modification, instead of forming a plain gel cylinder, a hollow cylinder analogous with that one mentioned in the first modification is prepared, the central hole of which is fitted with a cooling device (e.g. a jacketed cooling tube in which a coolant liquid is circulated). Hence, in such variation, a differential thermal control can be exerted on the diffusion and migration process by externally heating the liquid in which the hollow gel is immersed and simultaneously cooling the central part thereof.

BRIEF DESCRIPTION OF THE DRAWING

The following Examples illustrate the invention for which reference is made to the annexed drawing. In said drawing.

SPECIFIC DESCRIPTION AND EXAMPLES

EXAMPLE 1

ILLUSTRATION OF THE FIRST PREPARATIVE EMBODIMENT

Figure 1:
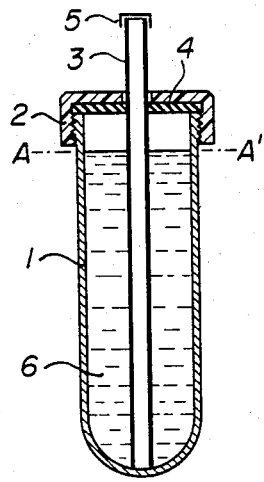
FIG. 1 is a schematic view of a container for making a centrally hollow precursor wet gel mass.

The device represented (see FIG. 1) comprises a tubular mold 1 fitted with a plastic threaded cap 2 containing in its center a tightly fitted dip tube 3 which also extends though a washer 4 down to the bottom of the tube 1. A piece of aluminum foil 5 protects the outside end of tube 3.

Figure 2:
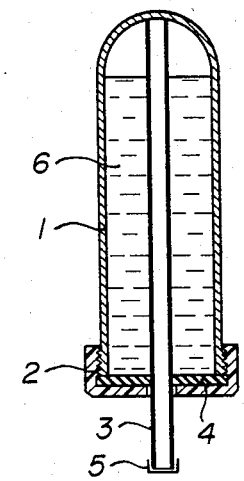
FIG. 2 is a schematic view of the same container in the up-turned position.
Figure 3:
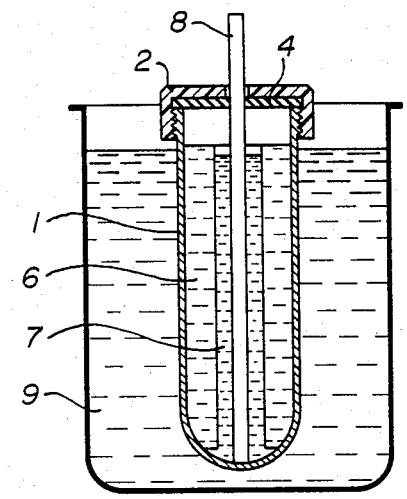
FIG. 3 is a schematic view of the same container and the gel precursor therein with its central hollow space filled with a dopant solution.

The molding tube is filled with a silicon alkoxide 6 solution up to the level indicated by the line A–A' and the assembly is turned up side down as shown in FIG. 2. The liquid contacts the washer 4 and is prevented from leaking by the pressure exerted by the screwed in cap on the mold walls and against the lateral walls of the dip tube 3. After allowing the whole to stand for some hours at room temperature, the precursor gel has sufficiently hardened and the central tube is removed and replaced (see FIG. 3) by a doping solution 7 and a heater 8. The whole is then immersed in a cooling bath 9 for providing a differential thermal effect between the central zone of diffusion and the external parts of the gel precursor. The heater is turned on and the doping compounds of the solution 7 are allowed to progressively diffuse into the concentric precursor mass until a desired doping profile is obtained, after which the heater and the cap are removed and the doped gel is removed by pulling.

In the present case, a solution by volume of 23.12% Si(OEt)$_4$, 52% ethanol, 4.8% methanol, 20% water and 0.08% acetylacetone or 2,4-pentanedione (catalyst) was put into the tube 1 and after screwing on the cap 2 with dip tube 3 and up-turning the outfit, the latter was allowed to stand for about 95 hrs at 25° C. until gelation was effective. The cap was removed and a diffusion solution containing, by volume, 44.7% Si(OEt)$_4$, 50.2% ethanol and 5.1% Ti(OEt)$_4$ was introduced into the hollow space left after removing tube 3. A 50 W rod heater element 8 was inserted and screwed in place and the whole container was placed in an ice-bath. The heater was turned on and provided an inner temperature of 62° C. The central solution was allowed to diffuse into the hollow gel precursor for 12 hrs. Then, the apparatus was allowed to rest for some minutes after which the doped wet gel was removed and dried for 72 hrs at 110° C. Curing and sintering to a glass rod were carried out as follows: the dried gel was slowly heated to 700° C. at the rate or 2° C./min under gentle air flow. The still entrapped volatiles were thus progressively eliminated and after final sintering and collapsing of the central hole at about 900° a flawless glassy rod was obtained. The doped region of the rod was visible where diffusion of the dopants had occurred in the gelled state.

The doping profile of the preform thus obtained was determined as follows: the specimen was cut transversally to the axis of the rod and the section was polished by usual means until perfectly clear. Then, a thin C layer was vapor deposited on the polished cross-section and the coated surface was analyzed in a SEM microscope fitted with an X-ray dispersive analyzer. The Ti radial concentration versus distance from the axis was found to vary as an approximately curvilinear function, the concentration difference between the periphery and the center being around 5%.

EXAMPLE 2

ILLUSTRATION OF THE SECOND PREPARATIVE EMBODIMENT

Figure 4:
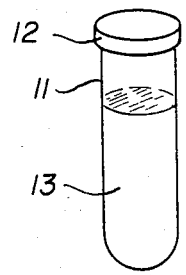
FIG. 4 is a schematic view of a cylindrical container partly filled with a solution for making a plain cylindrical wet gel mass.
Figure 5:
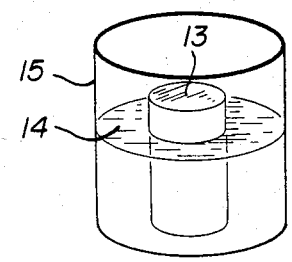
FIG. 5 is a schematic view showing a doped wet gel mass immersed in a solution for diffusion.

A cylindrical mold container 11 made of glass (see FIG. 4) was partly filled with a solution containing by weight: Si(OEt)$_4$ 20.12%, EtOH 50%, MeOH 4%, H$_2$O 20%, Ge(OEt)$_4$ 5.8% and acetylacetone 0.08%. An Al foil 12 was placed over the opening of the container to protect the liquid from the outside atmosphere and the whole was left aside for 80 hrs at 28° C. until a cylindrical gel 13 was formed in the container. The gel cylinder 13 was removed and immersed into a body of a 1:1 solution 14 of (EtO)$_4$Si and ethanol contained in a large beaker 15. The gel cylinder was allowed to stand in the solution 14 for 20 hrs at room temperature, whereby part of the germanium dopant diffused progressively off the gel and migrated into the surrounding solution. Thereafter, the gel 13 was removed and dried slowly at 110° in air for 90 hrs after which it was cured and sintered as described in Example 1.

The doping profile of the mother rod thus obtained was determined as described in Example 1 and was found to be curvilinear, the variation in concentration going from the center toward the periphery being about 8%.

EXAMPLE 3

Figure 6:
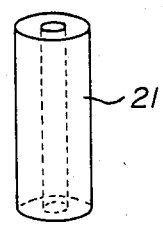
FIG. 6 is a schematic view of a cylindrical hollow wet gel mass.
Figure 7:
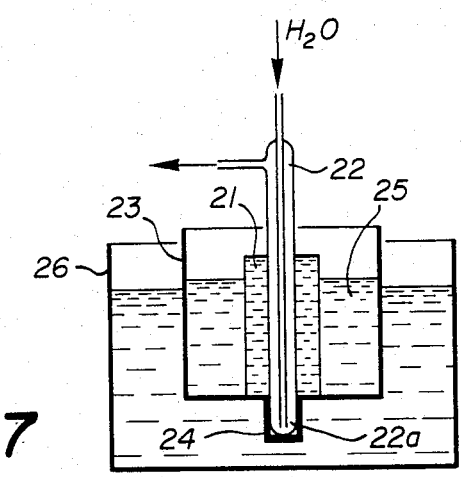
FIG. 7 is a schematic view of a hollow wet mass with central cooling means and immersed in a diffusion solution.

A cylindrical hollow gel piece 21 (see FIG. 6) was prepared using the device described in Example 1 and the solution containing silicon ethoxide and germanium ethoxide described in Example 2. The central axial hole of the gel piece 21 was adapted to fit with a cooling tube 22 (see FIG. 7), the length of the tube 22 being enough to have the lower tip 22a thereof projecting beyond the lower opening of the hollow gel 21. Then the gel piece 21 and cooling tube 22 were placed in a special shaped container 23 having a central bottom recess 24 for accepting the protruding tip 22a of the tube 22. The tube 22 and the surrounding gel piece 21 were thus maintained in place centrally in the container 23. The container 23 was then filled with a 1:1 solution 25 of ethanol and silicon ethoxide as shown in FIG. 7 and the whole assembly was placed in a water bath 26.

Water at 10°–12° C. was circulated in the cooling tube 22 and the water-bath 26 was heated to 60° C. whereby a temperature gradient between the central and peripheral portions of the gel 21 was established. Under such temperature gradient, the diffusion and migration of the dopant metal was accelerated and the desired doping profile could be obtained in about 2–4 hrs only. The gel cylinder 21 was thereafter dried, cured, sintered and collapsed to a glass mother-rod as described in Example 1. It was thereafter drawn into an optical fiber by usual drawing means, the fiber thus obtained having a graded refractive index profile suitable for communication transmission.

EXAMPLE 4

A solution (A) was prepared using the following ingredients (V/V%) and mixing them together at 70° C.

| | |
|---|---|
| Si(OEt)$_4$ | 26.5 |
| EtOH | 54.0 |
| MeOH | 11.0 |
| H$_2$O | 8.5 |

Then another solution (B) was prepared by mixing (V/V%) 10% of Ti(OEt)$_4$ and 90% of ethanol.

After solution A had cooled to room temperature, 20% by volume of solution B were slowly added to 80% by volume of solution A. Then, the mixture was poured into a mold like in Examples 2 or 3 and allowed to stand for providing a gel. This gel was processed exactly as described hereinabove in said Examples to furnish a graded doped wet gel which was further processed into a glass rod which was eventually drawn into optical fibers.

We claim:

1. A method for the preparation of a polysiloxane doped gel of following structure

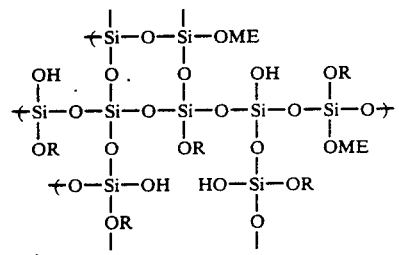

in which ME is at least one dopant (metals) metal and R is alkyl, consisting essentially of the following steps:
 (1) making an organic solution of silicon alkoxide and adding water for progressively hydrolyzing part of said alkoxide into the corresponding hydroxy functions with consecutive polycondensation by dehydration of said hydroxy functions to a cross-linked polysiloxane backboned wet gel body, and
 (2) thereafter placing said wet gel body as a first phase into surface contact with a body of a waterless nongelling organic solution of silicon alkoxide as a second phase, one of said phases containing at least one dopant metal alkoxide and letting the metals including silicon in still free unpolymerized form migrate by diffusion from one phase to the other, the direction of migration being from the phase richer in each metal to the phase leaner in the metal of the two phases to produce a smooth gradient profile across the doped gel of said dopant metal and (3) thereafter removing the doped gel body from the solution.

2. The method of claim 1, consisting essentially of the steps of
 (1') making a water-alkanol solution of a silicon alkoxide and letting the alkoxide groups progressively hydrolyze to corresponding silanol function with consecutive polycondensation and cross-linking of said functions to a polysiloxane wet gel body, (2′) placing said wet gel body into surface contact with a body of an alkanolic waterless silicone alkoxide solution of compounds of at least one dopant metal and diffusing said metal into the gel until a gradient concentration profile of said dopant in the gel is obtained and (3) thereafter removing the doped gel body from the solution.

3. The method of claim 1, consisting essentially of the steps of (1″) making a water-alkanol solution of a silicon alkoxide containing one or more dopant metals and progressively hydrolyzing the alkoxide groups to corresponding hydroxy functions followed by polycondensation and cross-linking to a uniformly doped polysiloxane wet gel body, (2″) placing said wet gel body into surface contact with a body of an anhydrous alkanolic silicon alkoxide solution for causing the dopant metal in the gel to migrate by diffusion into the anhydrous solution thus forming a partially depleted doped gel with a graded concentration profile and (3) thereafter removing the doped gel body from the solution.

4. The method of claim 2, where said gel body is in the form of a hollow cylinder and the dopant solution of step 2′ is placed in the center of this cylinder.

5. The method of claim 4, wherein during diffusion in step 2′, the dopant solution is heated and the outside of the cylinder is cooled to provide a radial temperature gradient through the gel.

6. The method of claim 3, wherein the gel body is in the form of a plain cylinder and the solution in step 2″ is placed for surrounding the outside cylindrical surface thereof, the concentration of the dopant after the end of the migration decreasing radially according to a desired profile.

7. The method of claim 3, wherein the gel body is in the form of a hollow cylinder, the central hollow bore being provided with a cooling means, the solution of step 2″ is placed to contact the outside cylindrical surface and is heated to provide a thermal gradient through the gel for accelerating the diffusion process.

* * * * *